United States Patent [19]

Higuchi et al.

[11] Patent Number: 4,646,888

[45] Date of Patent: Mar. 3, 1987

[54] ONE-DIRECTIONAL DRIVE APPARATUS

[75] Inventors: Yohji Higuchi, Okazaki; Hiroshi Matsuoka, Nagoya; Mikiya Ishihara, Kariya, all of Japan

[73] Assignee: Nippondenso Co., Ltd., Kariya, Japan

[21] Appl. No.: 734,138

[22] Filed: May 15, 1985

[30] Foreign Application Priority Data

May 16, 1984 [JP] Japan ................................ 59-99547

[51] Int. Cl.⁴ ............................................. F16D 49/02
[52] U.S. Cl. ................................ 192/8 C; 192/12 BA; 192/17 D
[58] Field of Search ............... 192/8 C, 12 BA, 17 D, 192/56 C, 33 C, 41 S, 81 C

[56] References Cited

U.S. PATENT DOCUMENTS

| | | | |
|---|---|---|---|
| 3,002,594 | 10/1961 | Haseler et al. | 192/8 C |
| 3,110,380 | 11/1963 | Meyer et al. | 192/8 C |
| 3,220,523 | 11/1965 | Hepner | 192/41 S X |
| 3,280,509 | 10/1966 | Werner | 192/8 C X |
| 3,757,472 | 9/1973 | Rogakos | 49/40 |
| 3,920,106 | 11/1975 | Nisenson | 192/33 C |
| 3,930,566 | 1/1976 | Matsushima | 192/8 C |
| 4,191,060 | 3/1980 | Sessa | 192/8 C X |
| 4,348,560 | 9/1982 | Ray et al. | 192/8 C X |

FOREIGN PATENT DOCUMENTS 2016642  9/1979  United Kingdom ............... 192/8 C Primary Examiner—Rodney H. Bonck
Assistant Examiner—Richard M. Lorence
Attorney, Agent, or Firm—Cushman, Darby & Cushman

[57] ABSTRACT

A dependable and reliable one-directional drive apparatus with drive prevention in the other direction is presented wherein a first and second reinforcement ring members are used to protect mechanically fragile tab portions of a coil spring while using a small diameter coil spring. One of the applications of the drive mechanism is a power actuated window-drive apparatus for a motor vehicle.

1 Claim, 6 Drawing Figures

ONE-DIRECTIONAL DRIVE APPARATUS

FIELD OF THE INVENTION

The present invention relates to one-directional drive apparatus which allows drive in one direction and prevents it in the other direction.

More specifically, the invention relates to a drive apparatus capable of transmitting a rotation motion from a motive source such as an electric motor to a driven source but prevents transmission from the driven source to the motive source. One of the applications of such apparatus is associated with a vehicle in which the window glass is opened and closed by a motor operated by the driver. However, the motor is desirably locked against its rotation to prevent the window glass from being opened or closed when the driver or any other person tries to open or close the window directly with his hands.

DESCRIPTION OF THE PRIOR ART

In the conventional type of drive apparatus opening and closing the window of a vehicle, the afore-mentioned one-directional drive mechanism with drive prevention in the opposite direction is achieved by using a reduction gear consisting of a worm and a worm wheel. In attempting to design a power actuation system including the above-mentioned drive mechanism, it was found that the reduction ratio of the worm reduction gear was very low. This, however, caused the need for a high-power electric motor to open and close the window. Therefore, in order to provide a compact and cheaper one-directional drive apparatus with drive prevention in the opposite direction, a coil spring is used.

Since one of the examples of the one-directional drive apparatus with reverse drive prevention mounted in a vehicle body is disclosed and claimed in the U.S. Pat. No. 3,757,472, the construction and operation thereof will now be explained hereinafter.

Referring now to FIG. 5, in operation of the drive mechanism when an electric motor (not shown) is activated, a spur gear 20 and pins 21 are rotated counter-clockwise or clockwise.

Since the four circumferentially spaced integral pins 21 of the spur gear 20 are pressed into holes 23 in a cup-like stamping 22, relative rotation between the pins 21 and the cup-like stamping 22 is prevented. In rotating counter-clockwise or clockwise, a flange portion 24 on the cup-like stamping 22 engages a tab 26 or 27 of a coil spring 25. At this time, if the cup-like stamping 22 is rotated counter-clockwise, the flange portion 24 engages the tab 26, and if rotated clockwise the flange portion 24 then engages the tab 27. In both directions, the flange's engaging the tab 26 or 27 imparts a slight counter-clockwise or clockwise rotation thereto which winds up the coil spring 25 such that the free outside diameter of the coil spring 25 becomes smaller.

An internal peripheral surface of a ring stamping 28 tightly engages the coil spring 25 which has a free-outside diameter larger than that of the ring stamping 28. Therefore, winding up the coil spring 25 disengages it from the internal surface of the ring stamping 28, this, then, allows rotation of the pins 21 and the cup-like stamping 22.

An output rotation disc 29 with a pinion 31 has four circumferentially spaced arcuate slots 30 which receive the pins 21 while allowing relative rotation between the cup-like stamping 22 and the output rotation disc 29.

Next, how the drive prevention in the other direction, namely, to drive the pins 21 from the output rotation disc side, is prevented, will now be explained.

When the output pinion 31 is rotated the output rotation disc 29 is also rotated. At this time, a circumferential wall 33 is spaced inwardly from the coil spring 25 and located in an arcuate space 267 defined between the tabs 26 and 27. Raising or lowering the window by the driver or any other person with his hands produces a counter-clockwise or clockwise rotation of the output pinion gear 31, this allowing a slight counter-clockwise or clockwise rotation of the disc 29 until an under-cut portion 32 engages either the tab 26 or the tab 27. Further rotation of the pinion gear 31 unwinds the coil spring 25 such that its free outside diameter becomes larger, so that the coil spring 25 tightly engages the internal surface of the stamped ring 28. The rotation torque thereon further tightens the coil spring 25 against the internal surface of the stamped ring 28, thus preventing the pinion 31 from further rotation.

However, such directional drive mechanism with reverse drive prevention as constructed above has short-comings as noted hereinafter. Namely, the diameter of the coil spring 25 is usually so designed that it is small whereby even a relatively small force is sufficient to possibly make the free outside diameter of the coil spring 25 larger in order to tighten the coil spring 25 against the internal surface on the ring stamping 28. This results in possibly breaking the small tabs 26 and 27.

SUMMARY OF THE INVENTION

It is, therefore, an object of the present invention to provide a compact, easily assembled, durable and reliable one-directional drive apparatus with reverse drive prevention.

Another object of the present invention is to provide a window glass opening and closing system incorporating such one-directional drive apparatus for easily opening and closing a window by the motor operated by the driver, but for locking the window against falling under its own weight or being pushed down or lifted up by the driver or any other person directly with his hands.

Briefly stated, in order to accomplish the afore-going objects, and according to features of the present invention, there are provided a coil spring 10 having a first integral tab 10$b$1 at one end and a second integral tab 10$b$2 at the opposite end making up an arcuate space defined between the tabs 10$b$1 and 10$b$2, a ring member 11 into which the coil spring 10 is inserted such that an internal peripheral surface of the ring member 11 engages the coil spring 10, an input rotating member 8 having a pair of projections spaced inwardly from the coil spring 10 and rotatably disposed in the arcuate space 10$a$, pivoting on almost center of the coil spring 10, and an output rotating member 12 having a pair of projections 12$a$ inserted into an inward space 10$c$ other than the arcuate space 10$a$ between the tabs 10$b$, respectively, the output rotating member 12 being rotatably disposed in the inward space 10$c$, pivoting on almost center of the coil spring 10.

According to an additional feature of the present invention, there are provided first and second stamped reinforcement members 13 and 14 covering the both end sides of the coil spring 10 respectively, the first and second stamped reinforcement members also covering the first and second extended tab portions. According to the construction thus made above, a breaking or a transformation of the tabs 10b can be avoided by being protected by the first and second stamped reinforcement members 13 and 14 respectively when the coil spring 10 is wound up or unwound. Therefore, a dependable one-directional drive apparatus with reverse drive prevention is provided with a small-diameter coil spring 10.

BRIEF DESCRIPTION OF DRAWINGS

FIG. 4b is an end view of the spring shown in FIG. 4a.

DESCRIPTION OF PREFERRED EMBODIMENT

Hereinafter, an embodiment of the present invention will now be explained in detail with reference to the drawings of FIGS. 1 to 4, which is an actuator for opening and closing a window of a vehicle.

Figure 1:
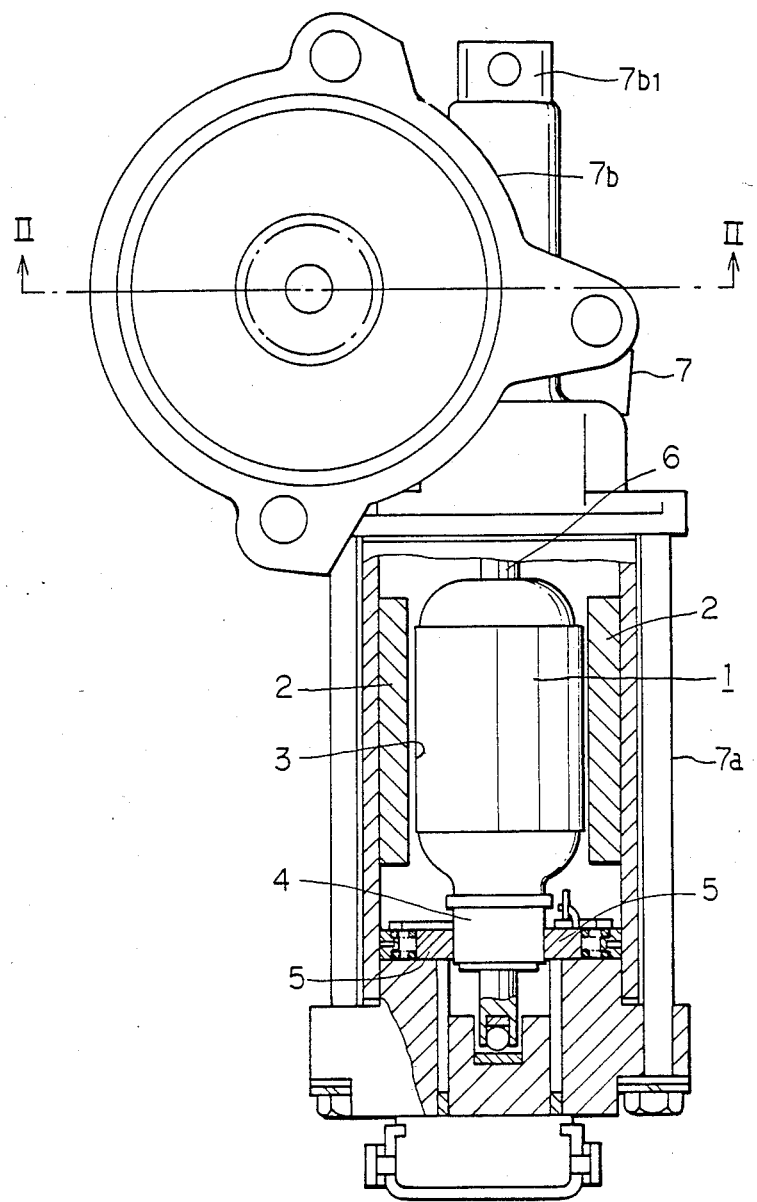
FIG. 1 is a side view in partial cross-section of an actuator used for a power-actuated window opening and closing system incorporating a one-directional drive with reverse drive prevention embodying the present invention.

Referring now to FIG. 1, an electric motor 1 is a known type of a DC motor having a permanent magnet 2, which consists of an armature 3, a commutator 4, brushes 5 and an output shaft 6. A housing 7 may be divided into two parts, a housing part 7a in which the DC motor is disposed, and a housing part 7b in which a reduction gear is installed. FIG. 1 shows a side view of the actuator used for the power-actuated window opening and closing system incorporating the one-directional drive apparatus of the present invention, including a partial cross-section of the inside of the motor housing 7a and a partial top-view of the housing 7b.

The motor output shaft 6 is, as shown in FIG. 1, extended along of the housing 7b and is rotatably disposed by means of a not-illustrated thrust bearing in the housing 7b.

Figure 2:
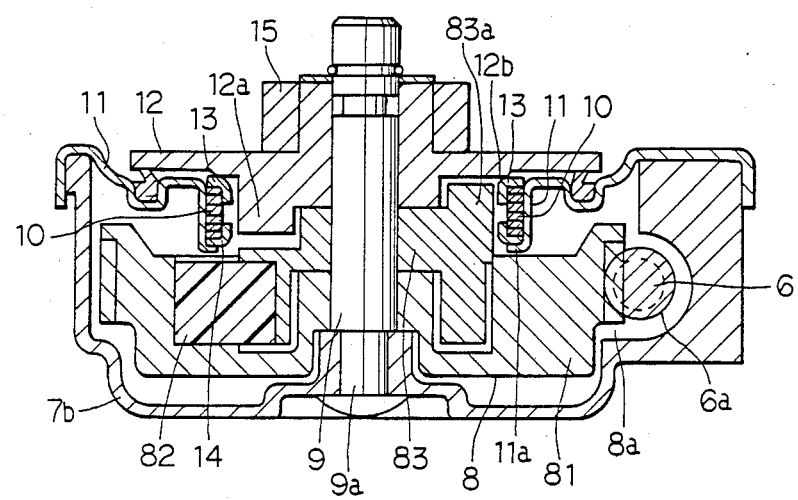
FIG. 2 is a sectional view taken along line II—II of FIG. 1.

Referring now to FIG. 2 the output shaft 6, journaled in the housing 7b, has a worm 6a thereon which meshes with a worm wheel 8a on an input rotating member 8. A fixed shaft 9 is fixed by means of staking to the center portion of the housing 7b. The fixed shaft 9 is crimped at 9a to prevent itself from working out of the housing 7b such that the shaft 9 is erected perpendicular to the housing 7b.

The input rotation member 8 is arranged and rotatably disposed on the fixed shaft 9.

Figure 3:
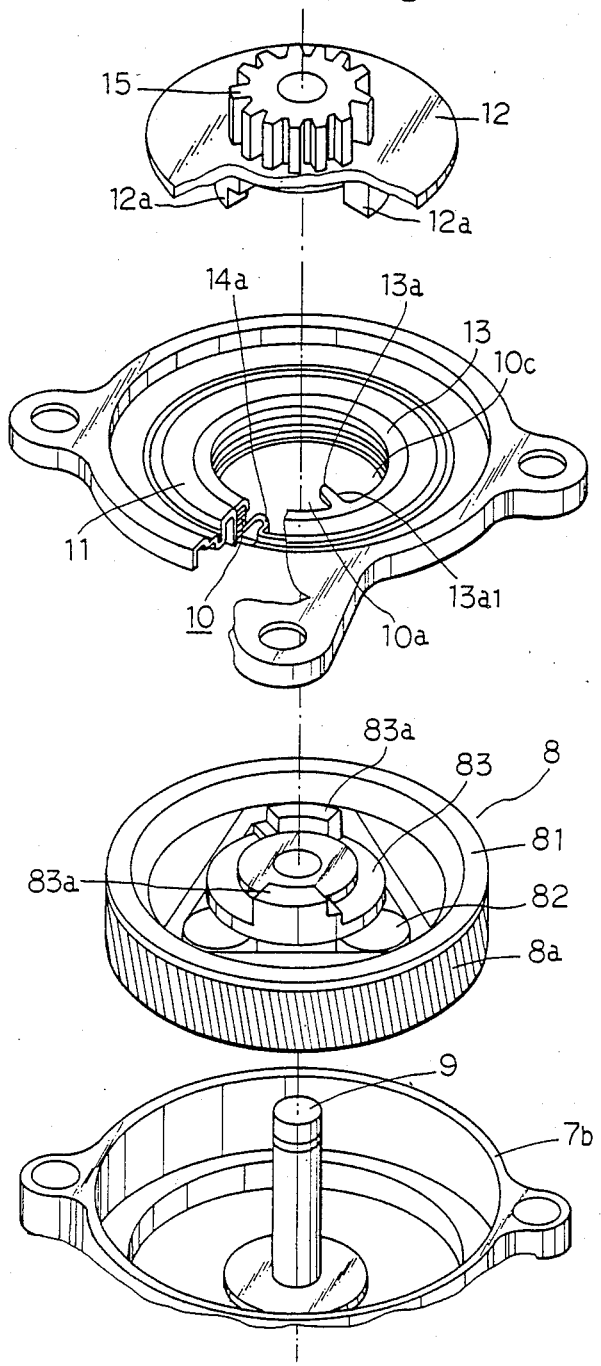
FIG. 3 is an exploded and perspective view of the parts shown in FIG. 2.

As best understood in conjunction with FIGS. 2 and 3, the input rotation member 8 consists of three members, the members being rotated all together. One of the members is a worm wheel body 81 comprising a toothed element 8a; another member is a damper 82 made of rubber; and the last member an end plate 83 connected through the damper 82 to the worm wheel body 81.

Between the end plate 83 and the worm wheel body 81 is bonded the damper 82 through which the rotation motion of the worm wheel body 81 is then transmitted to the end plate 83. Shapes of those three members are better illustrated in FIG. 3.

As also understood in FIG. 3, the end plate 83 has a pair of projections 83a, one of the projections 83a being inserted into the arcuate space 10a defined between the tabs 10b1 and 10b2 of the coil spring 10.

Figure 4A:
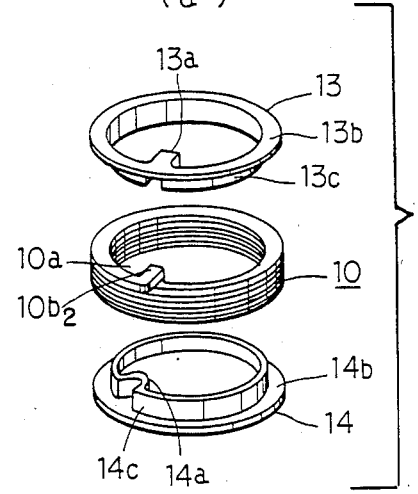
FIG. 4a is an exploded view in perspective of some of the parts shown in FIG. 3.
Figure 4B:
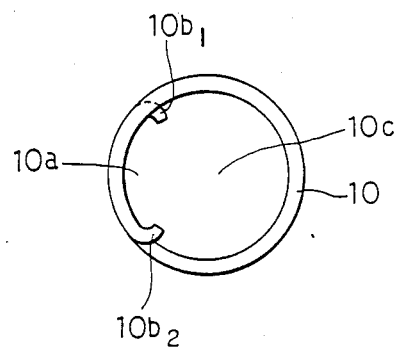
Figure 5:
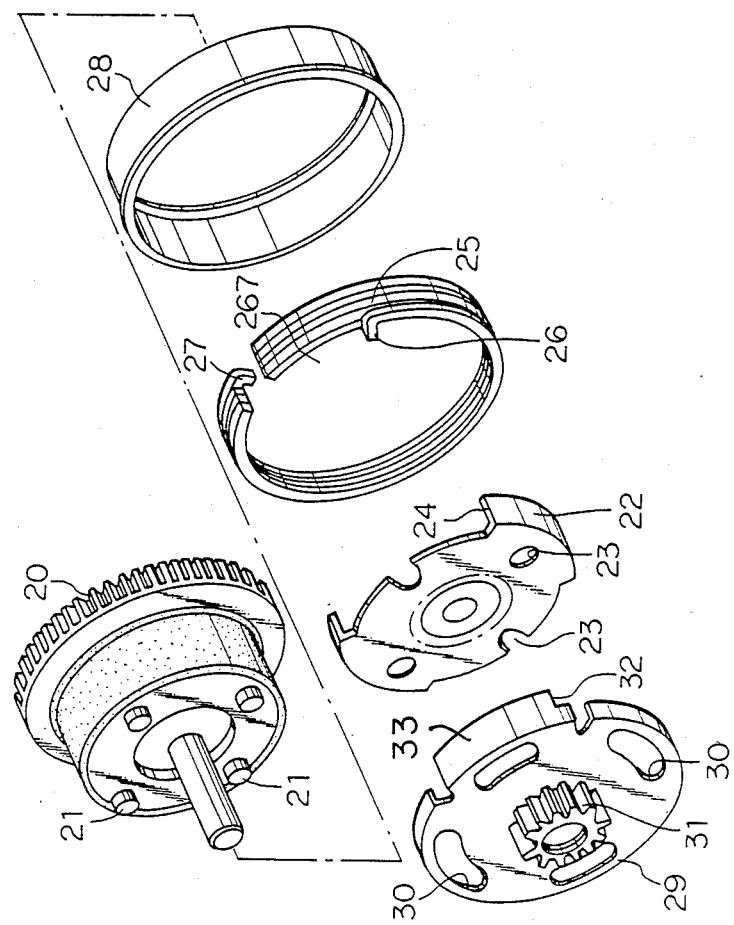
FIG. 5 is an exploded view in perspective of the corresponding part of the conventional drive mechanism.

The coil spring 10 is shown in relation to first and second reinforcement members 13 and 14 in FIG. 4(a). The coil spring 10 has at both ends a pair of tabs 10b1 and 10b2, both extending toward the center of the coil spring 10, one of which is not seen by being hidden behind the spring portion 10 in the figure. FIG. 4(b) shows an end view of the coil spring 10 having the tabs 10b1 and 10b2. There is formed an arcuate space 10a defined between the tabs 10b1 and 10b2 and the arcuate peripheral portion of the coil spring 10. The coil spring 10 per se need not be a spring especially designed for achieving the object of this invention, but may be the same as the conventional type spring 25 referred to in FIG. 5.

As also well understood in FIG. 2, the coil spring 10 is inserted into an iron plate ring member 11 fixed to the housing 7b such that an internal peripheral surface of the ring member 11 engages an outer peripheral surface of the coil spring 10.

An output rotation member 12 is rotatably disposed on the fixed shaft 9. This output rotation member 12 includes a pair of projecting portions 12a which are inserted into an inward space 10c other than the arcuate space 10a defined between the tabs 10b1 and 10b2 and the periphery of the coil spring 10. The first reinforcement member 13 is located between the output rotation member 12 and the coil spring 10. On the other hand, between the input rotation member 8 and the coil spring 10 is inserted the second reinforcement member 14. The first and second reinforcement members 13 and 14 have almost the same shape, both having flange portions 13a and 14a housing the tabs 10b respectively, flange portions 13b and 14b, and circumferential wall or sleeve portions 13c and 14c inserted into the coil spring 10. These first and second reinforcement ring members 13 and 14 holding the coil spring 10 from both end sides are supported by an edge portion 11a of the ring member 11 and an edge portion 12b of the output rotation member 12 respectively as shown in FIG. 2.

The drive mechanism of the above embodiment will now be explained. The D.C motor 1 is activated rotating the input rotating member 8 which causes the required relative movement between the projections 83a and the second reinforcement ring member 14, which in turn causes the coil spring 10 to wind up, thereby its free outside diameter becomes smaller. This wind up releases the coil spring 10 from the internal surface of the ring member 11. However, opposite torques on each of the tabs 10b1 and 10b2 aid in the unwinding of the coil spring 10 and tighten its engagement with the internal surface of the ring member 11.

The projections 83a of the input rotating member 8 push the tabs 10b1 and 10b2 of the coil spring 10 with great force in a circumferential direction. However, the tabs 10b are prevented from being twisted or broken because that such force is first received by the first and second support members 13 and 14, and further those tabs 10b are housed in the bulge portions 13a and 14a, and protected thereby.

On the other hand, when the window is pushed down or lifted up by the driver or any other person with his hands, an output pinion 15 tries to rotate counter-clockwise or clockwise, thereby the projecting portion 12a engages the bulge portion 14a of the input reinforcement ring member 14 or the bulge portion 13a of the output reinforcement ring member 14 at 13a1 according to the direction of the rotation. However, even if the output pinion 15 is rotated either counter-clockwise or clockwise, the coil spring 10 is designed so that it tries to unwind and tightly engages the internal peripheral surface of the ring member 11, causing braking effects therebetween, thus preventing the rotation movements. Even at this time, the tabs 10b1 and 10b2 are prevented from being twisted or broken for the same reason, as explained above, because the tabs 10b1 and 10b2 are housed in the bulge portions 13a and 14a, and protected thereby.

In the embodiment of the present invention thus far described, as the input and output reinforcement ring members 13 and 14 are so provided as to protect the tabs 10b1 and 10b2 from being twisted or broken. As a result, there is provided a compact, cheaper, durable and reliable one-directional drive apparatus with reverse drive prevention with a coil spring having an even smaller diameter than that of the conventional type coil spring.

In the embodiment of the present invention thus far described, further, a smaller diameter coil spring which easily winds up or unwinds, or in other words, of which the free outside diameter can be easily changed, can be used. Thus the motor can easily control the opening and closing of a vehicle window, while on the other hand, the reverse drive prevention effect is improved to a great extent.

What is claimed is:

1. A one-directional drive apparatus with reverse drive prevention comprising:
   a rotatable coil spring having a first radially inwardly projecting tab portion at one end thereof and a second radially inwardly projecting tab portion at the other end thereof, said portions being spaced circumferentially to provide an arcuate space therebetween;
   ring-like support means for and conforming to the opposite ends of said spring, each of said support means having a flange portion overlying and conforming to the corresponding end of said spring and the corresponding tab portion and a sleeve portion extending into and conforming to the interior of said spring and including a radially inwardly extending bulge portion embracing and conforming to the sides and end of the corresponding tab portion;
   a fixed braking ring member embracing said coil spring and restricting the unwinding thereof for engagement therebetween to brake rotation of said spring;
   a rotatable input member coaxial with said spring and adapted to be driven in either direction by a drive source, said input member having first and second diametric projections extending longitudinally into the interior of said ring, one of said projections being alternatively engageable with either of said support means bulge portions to move the corresponding tab portion in a direction to wind up said spring to thereby decrease the diameter thereof and release the braking thereof by said braking member; and
   a rotatable output member adapted to be connected to a member to be driven, said output member having first and second diametric projections extending longitudinally into the interior of said ring between said input member projections, one of said output member projections extending into said arcuate space for alternative engagement with either of said bulge portions to move the corresponding tab portion in a direction to unwind said spring and to thereby increase the diameter thereof and increase the braking thereof by said braking member.

* * * * *